United States Patent [19]
Kanto et al.

[11] Patent Number: 5,223,476
[45] Date of Patent: Jun. 29, 1993

[54] HEAT TRANSFER SHEET

[75] Inventors: Jumpei Kanto; Hitoshi Saito; Komei Kafuku; Masayuki Nakamura; Hiroshi Eguchi, all of Tokyo, Japan

[73] Assignee: Dai Nippon Insatsu Kabushiki Kaisha, Japan

[21] Appl. No.: 623,442

[22] PCT Filed: Apr. 17, 1990

[86] PCT No.: PCT/JP90/00562
§ 371 Date: Dec. 18, 1990
§ 102(e) Date: Dec. 18, 1990

[30] Foreign Application Priority Data

| May 2, 1989 | [JP] | Japan | 1-111969 |
| Jul. 24, 1989 | [JP] | Japan | 1-190868 |
| Aug. 31, 1989 | [JP] | Japan | 1-223277 |

[51] Int. Cl.$^5$ .................... B41M 5/035; B41M 5/38
[52] U.S. Cl. .................... 503/227; 428/195; 428/913; 428/914
[58] Field of Search .................... 8/471; 428/195, 913, 428/914; 503/227

[56] References Cited

U.S. PATENT DOCUMENTS

| 4,743,582 | 5/1988 | Evans et al. | 503/227 |
| 4,748,149 | 5/1988 | Byers | 503/227 |
| 4,753,922 | 6/1988 | Byers et al. | 503/227 |
| 4,757,046 | 7/1988 | Byers et al. | 503/227 |

FOREIGN PATENT DOCUMENTS 0218397 4/1987 European Pat. Off. ............ 503/227

OTHER PUBLICATIONS

Patent Abstracts of Japan, vol. 10, No. 21, Jan. 28, 1986 JP-A-60 180889.
Patent Abstracts of Japan, vol. 11, No. 380, Dec. 11, 1987 JP-A-62 149492.

*Primary Examiner*—B. Hamilton Hess
*Attorney, Agent, or Firm*—Parkhurst, Wendel & Rossi

[57] ABSTRACT

The heat transfer sheet according to this invention including a substrate sheet and a dye carrier layer formed on one side of the substrate sheet and includes a dye and a binder. The dye contained in the dye carrier layer includes a compound having two chromophores linked together through a divalent linking group, and is improved in terms of both color density and storability, thus producing excellent effects.

14 Claims, No Drawings

HEAT TRANSFER SHEET

TECHNICAL FIELD

The present invention relates to a heat transfer sheet. More particularly, this invention seeks to provide a heat transfer sheet which can make image representations excelling in terms of printability such as color density and clearness, and storability.

BACKGROUND ART

Various heat transfer techniques heretofore known in the art include a sublimation heat transfer technique in which a sublimable dye is carried on a substrate sheet such as paper as a recording medium to form a heat transfer sheet. The heat transfer sheet is then overlaid on an image-receiving material, which is dyeable with the sublimable dye, such as a polyester woven fabric. A heat energy is finally applied to the assembly from the back side of the heat transfer sheet in a patterned form to transfer the sublimable dye onto the image-receiving material.

In recent years, it has also been proposed to make use of the above-mentioned sublimation type of heat transfer technique to form various full-color images on paper or plastic films. In this case, the heating means used is a printer's thermal head which can transfer a number of color dots of three or four colors onto the image-receiving material by very quick heating, thereby reproducing a full-color image representation of a manuscript with the multicolor dots.

The thus formed image is very clear and excels in transparency due to the coloring material used being a dye, so that it can be improved in terms of the reproducibility of neutral tints and gray scale. Thus, it is possible to form a high-quality image equivalent to an image achieved by conventional offset or gravure printing and comparable to a full-color photographic image.

The most serious problems with the above-mentioned heat transfer technique, however, arise in connection with the color density, storability and resistance to discoloration/fading of the formed image.

In other words, a heat energy for fast recording should be applied within as short a time as possible, say, the fraction of a second. Within such a short time, however, both the sublimable dye and the image-receiving material cannot fully be heated, thus failing to make an image representation of sufficient density.

For that reason, a sublimable dye having an improved sublimability has been developed accommodate to such fast recording. However, since the sublimable dye of an improved sublimability has generally a low molecular weight, it is likely to migrate or bleed through the image-receiving material subjected to heat transfer, as time passes. This leads to a storability problem that the formed image may become disfigured or blurred, or otherwise contaminate surrounding articles.

In order to avoid such a problem, it has been proposed to use a sublimable dye having a relatively high molecular weight. With this, however, it has been impossible to form any image of satisfactory density, since its rate of sublimation is insufficient for such a fast recording technique as mentioned above.

Another problem is that because of being formed by the dye, the resulting image is generally so inferior in light resistance to a pigmented image that it fades or discolors prematurely upon exposure to direct sunlight. This light resistance problem may be solved to some extent by adding UV absorbers or antioxidants to a dye-receiving layer of the image-receiving material.

However, the discoloration/fading problem arises not only by direct sunlight but also by other light, e.g., indoor light, or even under conditions not directly exposed to light, e.g., in albums, cases and books. These indoor or in-the-dark discoloration/fading problems can never be solved by using general UV absorbers or antioxidants.

It is therefore an object of this invention to provide a heat transfer sheet used with the heat transfer technique making use of a sublimable dye, which can give a clear image of not only sufficient density but also improved fastness properties, esp., improved storability and resistance to discoloration/fading.

DISCLOSURE OF THE INVENTION

The heat transfer sheet of this invention includes a substrate sheet and a dye carrier layer formed on one side of the substrate sheet and comprising a dye and a binder. The dye contained in the dye carrier layer comprises a compound having two chromophores linked together through a divalent linking group. Preferably, the divalent linking group is non-conjugated with the chromophores.

By using such a dye of a specific structure as mentioned above, it is possible to provide a heat transfer sheet capable of making an image representation having both a high density and improved fastness properties (esp., storability and resistance to discoloration and fading), because the dye used migrates easily onto an image-receiving material even by very quick application of heat energy.

BEST MODE FOR CARRYING OUT THE INVENTION

In this invention, the dye contained in the dye carrier layer comprises a compound having two chromophores linked together through a divalent linking group. More illustratively, the following compounds are preferably used as such dyes.

Dye (I)

Dyes represented by the following general formula (I):

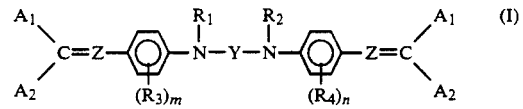

wherein:

groups $R_1$ and $R_2$, which may be identical with or different from each other, each stand for a hydrogen atom, a substituted or unsubstituted alkyl, cycloalkyl, aralkyl or aryl group, or an atom or atomic group which forms a five- or six-membered ring together with groups $R_3$ or $R_4$;

groups $R_3$ and $R_4$, which may be identical with or different from each other, each stand for a hydrogen atom, a halogen atom, a cyano group, or a substituted or unsubstituted alkyl, cycloalkyl, alkoxy, aryl, aralkyl, acylamino, sulfonylamino, ureido, carbamoyl, sulfamoyl, acyl or amino group;

groups $A_1$ and $A_2$ denote identical or different electron attractive groups, provided that one of groups $A_1$ and $A_2$ may be an aryl group;

group Z indicates a methine group or a nitrogen atom;

group Y represents a divalent linking group; and m and n each are an integer of 1-3.

More preferable dyes according to this invention will now be explained in greater detail.

Of the dyes of Formula (I) used in this invention, those in which Z is a methine group, for instance, may be obtained by permitting 2 moles of an aniline, which may have a substituent in its benzene ring, more preferably N-monosubstituted aniline to react with 1 mole of an aliphatic, aliphatic-aromatic or aromatic dihalogen compound to obtain a dimer, then allowing the dimer to react with a Bilsmyer reagent to prepare a bisformyl compound of the dimer and finally permitting malononitrile or its derivative to react with the formyl group of the bisformyl compound.

It is noted that the use of a mixture of aniline derivatives in the aforesaid first reaction results in an asymmetric dye.

Of the dyes of Formula (I) used in this invention, those in which Z is a nitrogen atom may similarly be obtained by using, e.g., a p-nitroaniline derivative for the first reaction in place of the aniline derivative to obtain a dinitro-substituted derivative, then reducing the nitro group of the derivative to an amino group and finally allowing malononitrile or its derivative to react with this amino group.

Such preparations as mentioned above are given by way of example alone. The dyes used in this invention, for instance, may also be obtained by other preparations in which both the chromophoric moieties are first prepared and then linked together by a suitable linking group.

The dyes (I) used in this invention have the substituents as already defined. More preferably, the groups $R_1$ and $R_2$ each represent an alkyl group having 1-6 carbon atoms; $R_3$ and $R_4$ a hydrogen atom or an alkyl group having 1-6 carbon atoms; $A_1$ and $A_2$ a cyano group or an alkoxycarbonyl group having 1-6 carbon atoms; and Y an unsubstituted or substituted alkylene group such as methylene, ethylene, propylene, butylene, pentylene, hexylene, heptylene, octylene, bromoethylene, 2,3-dichloroethylene, 2-hydroxypropylene, 2,7-dihydroxyoctylene and 2-cyanobutylene groups; an alkenylene group such as vinylene, propenylene, butenylene and pentenylene groups; an unsubstituted or substituted arylene group such as phenylene, hydroxyphenylene, methylphenylene and naphthylene groups; or further an alkylene, alkenylene or arylene group containing such functional groups as set out below (ether, thioether, carbonyl, amino, amide, imide, ureido, carbonyloxy, sulfonyl, sulfonylamide, vinyl and like groups):

—CH$_2$CH$_2$OCH$_2$CH$_2$—

—CH$_2$CH$_2$SCH$_2$CH$_2$—

—CH$_2$CH$_2$COCH$_2$CH$_2$—

—CH$_2$CH$_2$OCOCH$_2$CH$_2$—

—CH$_2$CH$_2$CONHCOCH$_2$CH$_2$CH$_2$—

—CH$_2$NHCONHCH$_2$—

—CH$_2$CH$_2$CONHCH$_2$CH$_2$—

—CH$_2$SO$_2$NHCH$_2$—

—CH$_2$CH$_2$SO$_2$CH$_2$CH$_2$—

—CH$_2$CH$_2$C≡CCH$_2$CH$_2$—

—CH=CHCH$_2$COCH$_2$CH$_2$—

—Ph—NHCO—Ph—

—CH$_2$OCH$_2$—Ph—CH$_2$OCH$_2$—

More preferably, the linking group is an alkylene group having 2-10 carbon atoms, which may contain different atoms such as oxygen, sulfur and nitrogen atoms.

Preferably, the dyes (I) used in this invention have a molecular weight of at least 400.

Illustrative examples of the dyes (I) suitable for this invention are set out in Table A1, wherein illustrative examples of the substituents $R_{1-4}$, $A_{1-2}$, Z and Y in Formula (I) are given together with the values for m and n and molecular weights.

TABLE A1

| No. | $R_1$ | $R_2$ | $R_3$ (m) | $R_4$ (n) | $A_1$ | $A_2$ | Y | Z | M.W. |
|---|---|---|---|---|---|---|---|---|---|
| 1 | C$_2$H$_5$ | C$_2$H$_5$ | CH$_3$(1) | CH$_3$(1) | CN | CN | (CH$_2$)$_2$ | CH | 448 |
| 2 | C$_2$H$_5$ | C$_2$H$_5$ | CH$_3$(1) | CH$_3$(1) | CN | COOCH$_3$ | (CH$_2$)$_2$ | CH | 514 |
| 3 | nC$_4$H$_9$ | nC$_4$H$_9$ | H | H | CN | CN | (CH$_2$)$_2$ | CH | 476 |
| 4 | nC$_4$H$_9$ | nC$_4$H$_9$ | H | H | CN | nPrNHCO | (CH$_2$)$_2$ | CH | 596 |
| 5 | C$_2$H$_5$ | C$_2$H$_5$ | CH$_3$(1) | CH$_3$(1) | CN | nPrNHCO | (CH$_2$)$_2$ | CH | 568 |
| 6 | CH$_3$ | CH$_3$ | H | H | CN | CN | (CH$_2$)$_2$O(CH$_2$)$_2$ | CH | 436 |
| 7 | nC$_4$H$_9$ | nC$_4$H$_9$ | H | H | CN | CN | (CH$_2$)$_2$O(CH$_2$)$_2$ | CH | 520 |
| 8 | C$_2$H$_5$ | C$_2$H$_5$ | CH$_3$(1) | CH$_3$(1) | CN | CN | .(CH$_2$)$_5$ | CH | 490 |
| 9 | nC$_4$H$_9$ | nC$_4$H$_9$ | H | H | CN | CN | (CH$_2$)$_5$ | CH | 518 |
| 10 | nC$_4$H$_9$ | nC$_4$H$_9$ | H | H | CN | CN | (CH$_2$)$_8$ | CH | 560 |
| 11 | nC$_4$H$_9$ | nC$_4$H$_9$ | CH$_3$(1) | CH$_3$(1) | CN | CN | (CH$_2$)$_5$ | CH | 546 |
| 12 | nC$_4$H$_9$ | nC$_4$H$_9$ | CH$_3$(1) | CH$_3$(1) | CN | CN | (CH$_2$)$_8$ | CH | 588 |
| 13 | nC$_4$H$_9$ | nC$_4$H$_9$ | OC$_2$H$_5$(1) | OC$_2$H$_5$(1) | CN | CN | (CH$_2$)$_5$ | CH | 606 |
| 14 | nC$_4$H$_9$ | nC$_4$H$_9$ | NHCOC$_2$H$_5$(1) | NHCOC$_2$H$_5$(1) | CN | CN | (CH$_2$)$_5$ | CH | 660 |
| 15 | C$_2$H$_5$ | C$_2$H$_5$ | NHSO$_2$C$_2$H$_5$(1) | NHSO$_2$C$_2$H$_5$(1) | CN | CN | (CH$_2$)$_5$ | CH | 676 |
| 16 | C$_2$H$_5$ | C$_2$H$_5$ | NHC$_2$H$_5$(1) | NHC$_2$H$_5$(1) | CN | CN | (CH$_2$)$_5$ | CH | 548 |
| 17 | C$_2$H$_4$CN | C$_2$H$_4$CN | H | H | CN | CN | (CH$_2$)$_5$ | CH | 512 |
| 18 | C$_2$H$_4$OH | C$_2$H$_4$OH | H | H | CN | CN | (CH$_2$)$_5$ | CH | 494 |
| 19 | CH$_2$Ph | CH$_2$Ph | H | H | CN | CN | (CH$_2$)$_5$ | CH | 586 |
| 20 | nC$_4$H$_9$ | nC$_4$H$_9$ | CH$_3$(1) | CH$_3$(1) | CN | CN | (CH$_2$)$_2$CONH(CH$_2$)$_2$ | CH | 575 |
| 21 | nC$_4$H$_9$ | nC$_4$H$_9$ | CH$_3$(1) | CH$_3$(1) | CN | CN | p-phenylene | CH | 552 |
| 22 | CH$_2$ cyclohexil | CH$_2$ cyclohexil | CH$_3$(1) | CH$_3$(1) | CN | CN | (CH$_2$)$_5$ | CH | 626 |
| 23 | nC$_4$H$_9$ | nC$_4$H$_9$ | H | H | CN | COPhCl(m) | (CH$_2$)$_6$ | CH | 759 |
| 24 | nC$_4$H$_9$ | nC$_4$H$_9$ | H | H | CN | SO$_2$C$_2$H$_5$ | (CH$_2$)$_3$ | CH | 624 |

TABLE A1-continued

| No. | R₁ | R₂ | R₃ (m) | R₄ (n) | A₁ | A₂ | Y | Z | M.W. |
|---|---|---|---|---|---|---|---|---|---|
| 25 | nC₄H₉ | nC₄H₉ | H | H | SO₂NHC₂H₅ | CN | (CH₂)₅ | CH | 682 |
| 26 | nC₄H₉ | nC₄H₉ | Cl(1) | Cl(1) | COC₂H₅ | CN | (CH₂)₅ | CH | 649 |
| 27 | C₂H₅ | C₂H₅ | NHCONHC₂H₅ | NHCONHC₂H₅ | CN | CN | (CH₂)₅ | CH | 634 |
| 28 | nC₄H₉ | nC₄H₉ | CH₃(1) | CH₃(1) | CN | CN | (CH₂)₅ | CH | 648 |
| 29 | nC₄H₉ | nC₄H₉ | H | H | —COPhCl(m) | CN | (CH₂)₆ | N | 761 |
| 30 | nC₄H₉ | nC₄H₉ | H | H | CN | nPrNHCO | (CH₂)₂ | N | 598 |
| 31 | nC₄H₉ | nC₄H₉ | CH₃(1) | CH₃(1) | CN | nPrNHCO | (CH₂)₂ | N | 626 |
| 32 | nC₄H₉ | nC₄H₉ | H | H | CN | CN | (CH₂)₅ | N | 520 |

Dye (II)

Dyes represented by the following general formula (II):

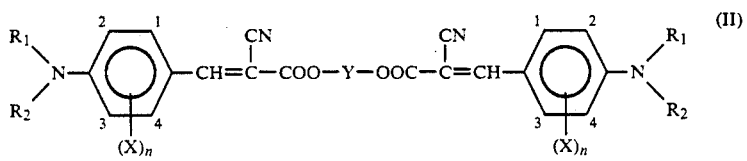

wherein:
groups R₁ and R₂, which may be identical with or different from each other, each stand for a hydrogen atom, a substituted or unsubstituted alkyl, cycloalkyl, aralkyl or aryl group, or may form together a five- or six-membered ring;

groups X, which may be identical with or different from each other, each represent a hydrogen or halogen atom, or a substituted or unsubstituted alkyl, cycloalkyl, alkoxy, aralkyl, acylamino, sulfonylamino, ureido, carbamoyl, sulfamoyl, alkoxycarbonyl, allyloxycarbonyl, acyl or amino group;

group Y represents a divalent linking group; and
m and n each are an integer of 1 or 2.

The dyes (II) will now be explained more illustratively with reference to their preferable embodiments.

The dyes of Formula (II) used in this invention, for instance, may be obtained by the reaction between 1 mole of a diester of 2 moles of cyanoacetic acid with 1 mole of glycol and 2 moles of a p-N-substituted benzaldehyde or between 2 moles of a reaction product of 1 mole of cyanoacetic acid with 1 mole of said benzaldehyde and 1 mole of glycol, with both their chromophores being identical with or different from each other. It is understood that the dyes (II) may be prepared not only by the above-mentioned preparations—given by way of example only—but also by other preparative processes.

The dyes (II) used in this invention have such substituents as already defined More particularly, the groups R₁ and R₂ each represent an C₁₋₆ alkyl group which may have a substituent such as a chlorine atom or a cyano, hydroxyl, alkoxy, alkoxycarbonyl, phenyl or acyloxy group; the groups X a halogen atom such as a fluorine, chlorine, bromine or iodine atom; a cyano group; an alkyl group such as a methyl, ethyl, propyl or butyl group; an alkoxyalkyl group such as a methoxyethyl or ethoxyethyl group; a hydroxyalkyl group such as a hydroxyethyl or β-hydroxypropyl; a halogenoalkyl group such as a chloroethyl group; a cyanoalkyl group such as a cyanomethyl or cyanoethyl group; a cycloalkyl group such as a cyclohexane group; an alkoxy group such as a methoxy, propoxy or butoxy group; an aryl group such as a phenyl, tolyl, halogenophenyl or alkoxyphenyl group; an aralkyl group such as a benzyl or phenetyl group; an acylamino group such as an acetylamino or benzoylamino group; a sulfonylamino group such as a methanesulfonylamino, ethanesulfonylamino or benzenesulfonylamino group; an ureido group such as a methylureido, 1,3-methylureido or ethylureido group; a carbamoyl group such as an ethylcarbamoyl or phenylcarbamoyl group; a sulfamoyl group such as a methylsulfamoyl, ethyl-sulfamoyl or phenylsulfamoyl group; an acyl group such as an acetyl, propanoyl or benzoyl group; and an amino group such as a methylamino, ethylamino, propylamino, dimethylamino or diethylamino group; and the linking group Y an unsubstituted or substituted alkylene group such as an ethylene, propylene, butylene, pentylene, hexylene, heptylene, octylene, bromoethylene, 2,3-dichloroethylene, 2-hydroxypropylene, 2,7-dihydroxyoctylene or 2-cyanobutylene group, or further such an alkylene group as mentioned above, which contains a group such as an ether, thioether, carbonyl, amino, amide, imide, ureido, carbonyloxy, sulfonyl, sulfonylamino or vinyl group.

Particularly preferred linking groups are C₂₋₁₀ alkylene groups which may contain different atoms such as oxygen, sulfur and nitrogen atoms.

Preferably, the dyes (II) used in this invention have a molecular weight of at most 700.

Illustrative examples of the dyes (II) suitable for this invention are set out in Table B1, wherein illustrative examples of the substituents R₁₋₂ and X in Formula (II) are given together with the values for n and molecular weights.

TABLE B1

| No. | R₁ | R₂ | X | n | Y | M.W. |
|---|---|---|---|---|---|---|
| 1 | —C₂H₅ | —C₂H₅ | 1-CH₃ | 1 | —C₂H₄— | 542.0 |
| 2 | —C₂H₅ | —C₂H₅ | H | 1 | —C₃H₆— | 528.0 |
| 3 | —C₂H₅ | —C₂H₅ | 1,3-CH₃ | 2 | —C₂H₄— | 570.0 |
| 4 | —C₂H₅ | —C₂H₅ | 1-OC₂H₅ | 1 | —C₂H₄— | 602.0 |
| 5 | —C₂H₅ | —C₂H₅ | 1,3-OCH₃ | 2 | —C₂H₄— | 634.0 |
| 6 | —CH₃ | —CH₃ | 1-NHCOC₂H₅ | 1 | —C₃H₆— | 614.0 |

TABLE B1-continued

| No. | R₁ | R₂ | X | n | Y | M.W. |
|---|---|---|---|---|---|---|
| 7 | —C₂H₅ | —C₂H₅ | 1-NHCOC₃F₇ | 1 | —C₂H₄— | 936.0 |
| 8 | —C₂H₅ | —C₂H₅ | 1-NHSO₂CH₃ | 1 | —C₄H₈— | 728.0 |
| 9 | —C₂H₅ | —C₂H₅ | 1-COC₂H₅ | 1 | —C₂H₄— | 626.0 |
| 10 | —C₂H₅ | —C₂H₅ | 1-COOPh | 1 | —C₆H₁₂— | 810.0 |
| 11 | —C₂H₅ | —C₂H₅ | 1-CONHCH₃ | 1 | —C₂H₄— | 628.0 |
| 12 | —C₂H₅ | —C₂H₅ | 1-SO₂NHC₂H₅ | 1 | —C₂H₄— | 728.0 |
| 13 | —C₂H₅ | —C₂H₅ | 1-NHCOC₂H₅ | 1 | —C₂H₄— | 686.0 |
| 14 | —C₂H₅ | —Ph | 1-CH₃ | 1 | —C₂H₄— | 638.0 |
| 15 | —C₂H₅ | —CH₂CN | 1-CH₃ | 1 | —C₂H₄— | 564.0 |
| 16 | —CH₃ | —C₂H₄Cl | 1-CH₃ | 1 | —C₂H₄— | 511.0 |
| 17 | —C₂H₅ | —C₂H₄OC₂H₅ | 1-CH₃ | 1 | —C₂H₄— | 630.0 |
| 18 | —C₂H₅ | —C₂H₄COOCH₃ | 1-CH₃ | 1 | —C₂H₄— | 658.0 |
| 19 | —C₂H₅ | —C₂H₄OH | 1-CH₃ | 1 | —C₂H₄— | 574.0 |
| 20 | —C₂H₅ | —CH₂Ph | 1-CH₃ | 1 | —C₂H₄— | 666.0 |
| 21 | —C₂H₅ | —C₂H₄OCOCH₃ | 1-CH₃ | 1 | —C₂H₄— | 658.0 |

Dye (III)

Dyes represented by the following general formula (III):

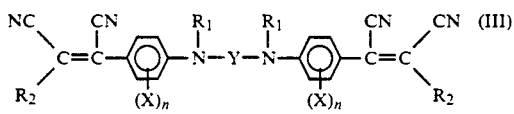

wherein:

groups $R_1$, which may be identical with or different from each other, each represent a hydrogen atom or a substituted or unsubstituted alkyl, cycloalkyl, aralkyl or aryl group, or may form together a five- or six-membered ring with groups X;

groups $R_2$ each denote an electron attractive group;

groups X, which may be identical with or different from each other, each stand for a hydrogen atom, a halogen atom, or a substituted or unsubstituted alkyl, cycloalkyl, alkoxy, aralkyl, acylamino, sulfonylamino, ureido, carbamoyl, sulfamoyl, acyl or amino group;

a group Y indicates a divalent linking group; and n is an integer of 1 or 2.

The dyes (III) will now be explained more illustratively with reference to their preferable embodiments.

The dyes of Formula (III) used in this invention may be easily produced by known methods, e.g., by preparing a compound expressed by the following general formula (c) by the dehydration and condensation of an aldehyde compound expressed by the following general formula (a) and an active methylene compound expressed by the following general formula (b) in the presence of an acid, base or acid-base catalyst and subjecting said compound (c) to cyanogenesis in suitable manners such as one set forth in Japanese Patent Kokai Koho 60 (1985)-38350, with both their chromophores being identical with or different from each other.

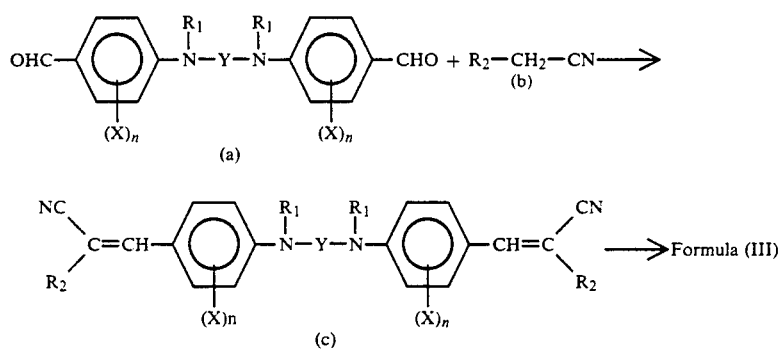

wherein $R_{1-2}$, X, Y and n have the same meanings as already defined.

The dyes (III) used in this invention have such substituents as already defined. More preferably, each of the groups $R_1$ represents a $C_{1-6}$ alkyl group which may have a substituent such as cyano, hydroxyl and phenyl groups; each of the groups $R_2$ a cyano, alkoxycarbonyl, alkyl- or aryl-aminocarbonyl, alkyl- or aryl-sulfonyl, alkyl- or aryl-aminosulfonyl, alkylcarbonyl, carbamoyl, sulfamoyl, alkoxycarbonyl, allyloxycarbonyl or like group; each of the groups X a hydrogen or halogen atom, or an alkyl, alkoxy, acylamino, alkylureido or like group; and the linking group Y an unsubstituted or substituted alkylene group such as an ethylene, propylene, butylene, pentylene, hexylene, heptylene, octylene, bromoethylene, 2,3-dichloroethylene, 2-hydroxypropylene, 2,7-dihydroxyoctylene or 2-cyanobutylene group, or further such an alkylene or alkenylene group as mentioned above, which contains a group such as an ether, thioether, carbonyl, amino, amide, imide, ureido, carbonyloxy, sulfonyl, sulfonylamino or vinyl group.

Particularly preferred linking groups are $C_{2-10}$ alkylene groups which may contain different atoms such as oxygen, sulfur and nitrogen atoms.

Preferably, the dyes (III) used in this invention have a molecular weight of at most 570.

Illustrative examples of the dyes (III) suitable for this invention are set out in Table C1, wherein illustrative examples of the substituents $R_{1-2}$, X and Y in Formula (III) are given together with the values for n and molecular weights and maximum absorption wavelengths (λmax).

TABLE C1

| No. | $R_1$ | $R_2$ | X | n | Y | M.W. | $\lambda$max |
|---|---|---|---|---|---|---|---|
| 1 | —$C_2H_4CN$ | —CN | —H | 1 | —$C_3H_6$— | 534.0 | 527 |
| 2 | —$C_2H_5$ | —CN | —$CH_3$ | 1 | —$C_2H_4$— | 498.0 | 539 |
| 3 | —$C_4H_9$ | —CN | —$CH_3$ | 2 | —$C_8H_{16}$— | 638.0 | 534 |
| 4 | —$C_2H_4OH$ | —CN | —$CH_3$ | 1 | —$C_8H_{16}$— | 614.0 | 535 |
| 5 | —$CH_2Ph$ | —CN | —H | 2 | —$C_4H_8$— | 622.0 | 515 |
| 6 | —$C_4H_9$ | —CN | —H | 1 | —$C_2H_4OC_2H_4$— | 570.0 | 521 |
| 7 | —$CH_3$ | —CN | —H | 1 | —$C_2H_4OC_2H_4$— | 486.0 | 517 |
| 8 | —$C_3H_7$ | —CN | —$NHCOCH_3$ | 1 | —$C_2H_4CONHC_2H_4$— | 683.0 | 520 |
| 9 | —$C_2H_5$ | —$COOC_2H_5$ | —H | 1 | —Ph— | 612.0 | 512 |
| 10 | —$C_2H_5$ | —$COOCH_3$ | —$CH_3$ | 1 | —$C_2H_4$— | 564.0 | 530 |
| 11 | —$C_4H_9$ | —$CONHC_4H_9$ | —H | 1 | —$C_2H_4$— | 674.0 | 506 |
| 12 | —$C_2H_5$ | —$CONHC_4H_9$ | —$CH_3$ | 1 | —$C_2H_4$— | 646.0 | 515 |
| 13 | —$C_4H_9$ | —CN | —H | 1 | —$C_5H_{10}$— | 568.0 | 523 |
| 14 | —$C_4H_9$ | —CN | —$CH_3$ | 2 | —$C_5H_{10}$— | 624.0 | 534 |
| 15 | —$C_4H_9$ | —CN | —H | 1 | —$C_5H_{10}$— | 568.0 | 523 |
| 16 | —$C_4H_9$ | —CN | —$CH_3$ | 1 | —$C_8H_{16}$— | 638.0 | 532 |
| 17 | —$C_4H_9$ | —CO(o-Cl)Ph | —H | 1 | —$C_6H_{12}$— | 809.0 | 567 |
| 18 | —$C_2H_5$ | —CN | —$OC_2H_5$ | 1 | —$C_5H_{10}$— | 600.0 | 530 |
| 19 | cyclohexil | —$SO_2C_2H_5$ | —H | 1 | —$C_3H_6$— | 726.0 | 506 |
| 20 | —Ph-p-Me | —$SO_2NHC_2H_5$ | —H | 1 | —$C_5H_{10}$— | 800.0 | 499 |
| 21 | —$C_2H_5$ | —CONHPh | —$NHCONHC_2H_5$ | 1 | —$C_6H_{12}$— | 886.0 | 514 |
| 22 | —$C_4H_9$ | —$COC_2H_5$ | —Cl | 1 | —$C_2H_4$— | 657.0 | 509 |

Dyes (IV) and (V)

Dyes represented by the following general formula (IV) or (V):

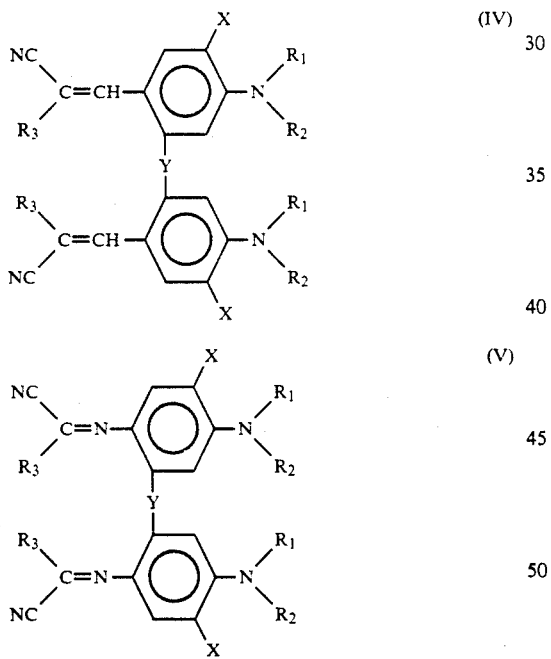

wherein:

groups $R_{1-2}$, which may be identical with or different from each other, each represent a hydrogen atom or a substituted or unsubstituted alkyl, cycloalkyl, aralkyl or aryl group, or may form together a five- or six-membered ring which may contain an oxygen, nitrogen or sulfur atom;

groups $R_3$, which may be identical with or different from each other, each denote an electron attractive group;

a group Y indicates a divalent linking group; and groups X each stand for a hydrogen atom or an atom or atomic group which forms a five- or six-membered ring together with $R_1$.

The dyes (IV) and (V) will now be explained more illustratively with reference to their preferred embodiments.

The dyes of Formula (IV) used in this invention may be easily produced by known processes, e.g. by the dehydration and condensation of an aldehyde compound expressed by the following general formula (a) and an active methylene compound expressed by the following general formula (b) in the presence of an acid, base or acid-base catalyst.

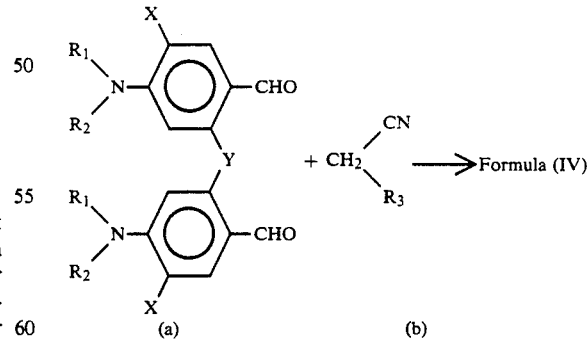

The dyes of Formula (V) used in this invention may again be easily produced by known processes, e.g. by the dehydration and condensation of a nitroso compound expressed by the following general formula (c) and an active methylene compound expressed by the following general formula (b) in the presence of an acid, base or acid-base catalyst.

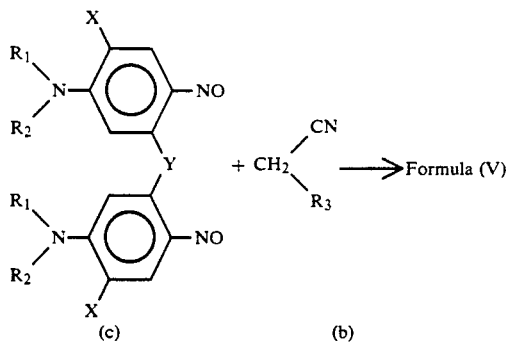

(c)     (b)

In Formulae (a)-(c), $R_{1-3}$ and Y have the same meanings as already defined.

In Formula (IV) or (V), preferable examples of the substituents expressed by $R_{1-2}$ are an alkyl group such as a methyl, ethyl, propyl or butyl group; an alkoxyalkyl group such as a methoxyethyl or ethoxyethyl group; a hydroxyalkyl group such as a hydroxyethyl or β-hydroxypropyl; a halogenoalkyl group such as a chloroethyl group; a cyanoalkyl group such as a cyanomethyl or cyanoethyl group; a cycloalkyl group such as a cyclohexane group; an aralkyl group such as a benzyl or phenetyl group; an aryl group such as a phenyl, tolyl, halogenophenyl or alkoxyphenyl group; and the like, or an atom which forms a five- or six-membered ring together with X. It is noted that $R_1$ and $R_2$ may form together a five- or six-membered ring which may contain an oxygen, nitrogen or sulfur atom.

Preferable examples of the electron attractive groups $R_3$ are a cyano group; an acyl group such as an acetyl, propanoyl or benzoyl group; an alkylsulfonyl group such as a methanesulfonyl or ethanesulfonyl group; an arylsulfonyl group such as a phenylsulfonyl or p-chlorophenylsulfonyl group; a carbamoyl group such as an ethylcarbamoyl or phenylcarbamoyl group; a sulfamoyl group such as a methylsulfamoyl, ethylsulfamoyl or phenylsulfamoyl group; an alkoxycarbonyl group such as a methoxycarbonyl, ethoxycarbonyl or propoxycarbonyl group; an aryloxycarbonyl group such as a phenoxycarbonyl or p-methylphenoxycarbonyl group; and the like.

Preferable examples of the divalent linking group Y are an oxygen atom; an unsubstituted or substituted alkylene group such as an ethylene, propylene, butylene, pentylene, hexylene, heptylene, octylene, bromoethylene, 2-hydroxypropylene; an alkenylene groups such as a vinylene, propenylene or butenylene group; an unsubstituted or substituted such as a phenylene, hydroxyphenylene or naphthylene group; or further an alkylene, alkenylene or arylene group containing such functional groups as set out below (ether, thioether, carbonyl, amino, amide, imide, ureido, carbonyloxy, sulfonyl, sulfonylamide, vinyl and like groups):

—CH$_2$OCH$_2$—

—CH$_2$CH$_2$SCH$_2$CH$_2$—

—CH$_2$N(R$_4$)—

(wherein $R_4$ stands for a hydrogen atom or an alkyl group)

—CH$_2$CH$_2$COCH$_2$CH$_2$—

—CH$_2$CH$_2$OCOCH$_2$CH$_2$—

—CH$_2$CH$_2$CONHCOCH$_2$CH$_2$—

—CH$_2$CH$_2$NHCONHCH$_2$CH$_2$—

—CH$_2$CONHCH$_2$—

—CH$_2$SO$_2$NHCH$_2$—

—CH$_2$CH$_2$SO$_2$CH$_2$CH$_2$—

—CH$_2$CH$_2$C=CCH$_2$CH$_2$—

—OCH$_2$—, —CH$_2$O—

Preferably, the dyes (IV) and (V) used in this invention have a molecular weight in the range of 300-700.

Illustrative examples of the dyes (IV) and (V) suitable for this invention are set out in Tables D1 and D2, respectively, wherein the substituents $R_{1-3}$ and Y in Formulae (IV) and (V) are shown together with molecular weights.

TABLE D1

| No. | $R_1$ | $R_2$ | $R_3$ | Y | M.W. |
|---|---|---|---|---|---|
| 1 | —C$_2$H$_5$ | —C$_2$H$_5$ | —CN | —CH$_2$— | 462.6 |
| 2 | —C$_2$H$_4$OH | —C$_2$H$_4$OH | —CN | —CH$_2$— | 526.6 |
| 3 | —C$_4$H$_9$ | —C$_4$H$_9$ | —CN | —CH$_2$— | 574.8 |
| 4 | —CH$_2$Ph | —CH$_2$Ph | —CN | —CH$_2$— | 710.9 |
| 5 | —C$_2$H$_4$Cl | —C$_2$H$_4$Cl | —CN | —CH$_2$— | 600.4 |
| 6 | —C$_2$H$_5$ | —C$_2$H$_5$ | —COOCH$_3$ | —CH$_2$— | 528.7 |
| 7 | —C$_2$H$_5$ | —C$_2$H$_5$ | —CONHCH$_3$ | —CH$_2$— | 526.7 |
| 8 | —C$_2$H$_4$CN | —C$_2$H$_4$CN | —SO$_2$NHC$_2$H$_5$ | —CH$_2$— | 726.9 |
| 9 | —C$_2$H$_4$OH | —C$_2$H$_5$ | —CN | —CH$_2$— | 494.6 |
| 10 | —C$_2$H$_5$ | —C$_2$H$_5$ | —CONHPh | —CH$_2$— | 650.8 |
| 11 | —C$_2$H$_5$ | —CH$_3$ | —COOCH$_3$ | —CH$_2$— | 500.6 |
| 12 | —C$_2$H$_5$ | —Ph | —CN | —CH$_2$— | 558.7 |
| 13 | —C$_2$H$_5$ | —C$_2$H$_5$ | —CN | —CH$_2$NH(C$_2$H$_5$)CH$_2$— | 520.8 |
| 14 | —C$_2$H$_4$OH | —C$_2$H$_4$OH | —CN | —CH$_2$NH(C$_2$H$_5$)CH$_2$— | 584.7 |
| 15 | —C$_2$H$_5$ | —C$_2$H$_5$ | —CONHCH$_3$ | —CH$_2$NH(C$_2$H$_5$)CH$_2$— | 584.8 |
| 16 | —C$_2$H$_5$ | —C$_2$H$_5$ | —CN | —O$_{13}$ | 464.6 |
| 17 | —C$_2$H$_5$ | —C$_2$H$_5$ | —CN | —CH$_2$CONHCH$_2$— | 519.7 |
| 18 | —C$_2$H$_5$ | —C$_2$H$_5$ | —CN | —CH$_2$H$_4$OC$_2$H$_4$— | 520.7 |
| 19 | —C$_2$H$_5$ | —C$_2$H$_5$ | —COOCH$_3$ | —CH$_2$H$_4$OC$_2$H$_4$— | 586.8 |
| 20 | —C$_2$H$_4$OH | —C$_2$H$_4$OH | —CN | —CH$_4$H$_8$— | 568.7 |
| 21 | —C$_2$H$_5$ | —C$_2$H$_5$ | —CN | —CO— | 476.6 |

TABLE D2

| No. | $R_1$ | $R_2$ | $R_3$ | Y | M.W. |
|---|---|---|---|---|---|
| 1 | —$C_2H_5$ | —$C_2H_5$ | —CN | —$CH_2$— | 464.6 |
| 2 | —$C_2H_4OH$ | —$C_2H_4OH$ | —CN | —$CH_2$— | 528.6 |
| 3 | —$C_4H_9$ | —$C_4H_9$ | —CN | —$CH_2$— | 576.8 |
| 4 | —$CH_2Ph$ | —$CH_2Ph$ | —CN | —$CH_2$— | 712.9 |
| 5 | —$C_2H_4Cl$ | —$C_2H_4Cl$ | —CN | —$CH_2$— | 602.4 |
| 6 | —$C_2H_5$ | —$C_2H_5$ | —$COOCH_3$ | —$CH_2$— | 530.6 |
| 7 | —$C_2H_5$ | —$C_2H_5$ | —$CONHCH_3$ | —$CH_2$— | 528.7 |
| 8 | —$C_2H_4CN$ | —$C_2H_4CN$ | —$SO_2NHC_2H_5$ | —$CH_2$— | 728.9 |
| 9 | —$C_2H_4OH$ | —$C_2H_5$ | —CN | —$CH_2$— | 496.6 |
| 10 | —$C_2H_5$ | —$C_2H_5$ | —CONHPh | —$CH_2$— | 652.8 |
| 11 | —$C_2H_5$ | —$CH_3$ | —$COOCH_3$ | —$CH_2$— | 502.6 |
| 12 | —$C_2H_5$ | —Ph | —CN | —$CH_2$— | 560.7 |
| 13 | —$C_2H_5$ | —$C_2H_5$ | —CN | —$CH_2NH(C_2H_5)CH_2$— | 522.7 |
| 14 | —$C_2H_4OH$ | —$C_2H_4OH$ | —CN | —$CH_2NH(C_2H_5)CH_2$— | 586.7 |
| 15 | —$C_2H_5$ | —$C_2H_5$ | —$CONHCH_3$ | —$CH_2NH(C_2H_5)CH_2$— | 586.8 |

The heat transfer sheet according to this invention is characterized by using such specific dyes as described above, and may otherwise be similar to conventional heat transfer sheets hitherto available in the art.

As the substrate sheets used for the instant heat transfer sheets containing the above-mentioned dyes, use may be made of any material heretofore known in the art and having some heat resistance and strength. For instance, mention is made of papers including various processed papers, polyester films, polystyrene films, polypropylene films, polysulfone films, polycarbonate films, aramide films, polyvinyl alcohol films and cellophane, all having a thickness of 0.5 to 50 μm, preferably 3 to 10 μm. Particular preference is given to polyester films.

The dye carrier layer formed on the surface of such a substrate sheet as mentioned above is a layer in which the above-mentioned dye is carried by any desired binder resin.

As the binder resin for carrying the dye, use may be made of any conventional resin heretofore known in the art. For instance, preference is given to cellulosic resins such as ethyl cellulose, hydroxyethyl cellulose, ethylhydroxy cellulose, hydroxypropyl cellulose, methyl cellulose, cellulose acetate and cellulose acetate butyrate; and vinylic resins such as polyvinyl alcohol, polyvinyl acetate, polyvinyl butyral, polyvinyl acetoacetal, polyvinyl pyrrolidone and polyacrylamide. Among others, particular preference is given to polyvinyl butyral and polyvinyl acetoacetal due to their heat resistance, dye migration and other properties.

Basically formed of the above-mentioned materials, the dye carrier layer of the instant heat transfer sheet may additionally contain various additives heretofore known in the art at need.

Such a dye carrier layer is preferably obtained by dissolving or dispersing the above-mentioned dye, binder resin and other desired components in a suitable solvent to prepare a coating or ink liquid for forming the carrier layer and coating and drying it on the above-mentioned substrate sheet.

The thus formed carrier layer has a thickness of 0.2 to 5.0 μm, preferably about 0.4 to 2.0 μm, and suitably contains the dye in an amount of 5 to 70% by weight, preferably 10 to 60% by weight based on its weight.

The heat transfer sheet according to this invention, which well serves the heat transfer purpose as such, may further be provided with an anti-tack or release layer on the surface of the dye carrier layer. Such a layer prevents adhesion of the heat transfer sheet to the associated image-receiving sheet during heat transfer, making it possible to form an image representation of a more improved density by applying more increased heat transfer temperatures.

For this release purpose, some effects may be obtained only by depositing an anti-tack inorganic powder onto the dye carrier layer. Alternatively, the release layer may be formed of a resin excelling in releasability such as silicone, acrylic and fluorinated polymers with a thickness of 0.01 to 5 μm, preferably 0.05 to 2 μm.

It is noted that sufficient effects are also obtained by incorporating the inorganic powder or releasing polymer into the dye carrier layer.

Additionally, the present heat transfer sheet may be provided on its back side with a heat-resistant layer to prevent the heat of a thermal head from producing an adverse influence thereupon.

The image-receiving material used to form an image representation with such a heat transfer sheet as described above may be any material having on its recording surface a layer capable of receiving the dye. Alternatively, such a material may be provided by forming a dye-receiving layer separately on at least one side of paper, a metal, glass or a synthetic resin including no dye-receiving layer.

For instance, the image-receiving material, which may not be provided with any dye-receiving layer, includes fibers, woven fabrics, films, sheets and formings of polyolefinic resins such as polypropylene; halogenated polymers such as polyvinyl chloride and polyvinylidene chloride; vinyl polymers such as polyvinyl acetate and polyacrylic ester; polyester type resins such as polyethylene terephthalate and polybutylene terephthalate; polystyrene type resins; polyamide type resins; resins based on copolymers of olefins such as ethylene and propylene with other vinyl monomers; ionomers; and cellulosic resins such as cellulose diacetate; polycarbonates, and the like.

Particular preference is given to a polyester sheet or film or a processed paper having a polyester layer. The image-receiving material may also be formed of paper, a metal, glass or other non-dyeable substrate by coating and drying a solution or dispersion of such a dyeable resin as described above on its recording surface. Alternatively, a film of that resin may be laminated on the recording surface.

Additionally, the image-receiving material may be provided with a dye-receiving layer of a resin having a more improved dyeability, as is the case with the paper substrate.

The thus formed dye-receiving layer may be made of a material or materials, and may of course contain various additives, provided that the desired object is achievable.

Although not critical, such a dye-receiving layer may generally have a thickness of 3 to 50 μm. Although it is preferred that such a dye-receiving layer is in a continuous coating form, it may be provided in a discontinuous coating form, using a resin emulsion or dispersion.

Such image-receiving material is basically constructed as described above, and may well serve its own purpose as such. However, an anti-tack inorganic powder may be incorporated into the image-receiving material or its dye-receiving layer. This makes it possible to prevent adhesion between the heat transfer sheet and the image-receiving material even at more elevated heat transfer temperatures, thereby carrying out more satisfactory heat transfer. Particular preference is given to finely divided silica.

In place of, or in combination with, the inorganic powder such as silica, another resin having a more improved releasability, as already described, may be added. A particularly preferred releasing polymer is a cured product of a silicone compound, e.g., a cured product of an epoxy-modified silicone oil and an amino-modified silicone oil. Preferably, such a release agent accounts for about 0.5 to 30% by weight of the dye-receiving layer.

In order to impart a more improved anti-tack effect to the image-receiving material, such an inorganic powder as described above may be deposited onto the surface of its dye-receiving layer. Alternatively, a layer containing such a release agent having an improved releasability as described above may be provided.

At a thickness of about 0.01 to 5 μm, such a release layer produces an effect so satisfactory that it can prevent adhesion between the dye-receiving layers of the heat transfer sheet and image-receiving material, while improving the dye receptivity further.

When carrying out heat transfer with the present heat transfer sheet and the above-mentioned image-receiving material, the heat energy applying means used may be any known applying means. For instance, the desired object may be well achieved by the application of a heat energy of about 5 to 100 mJ/mm$^2$, while the recording time is controlled with recording hardware such as a thermal printer (e.g., Video Printer VY-100 commercialized by Hitachi, Ltd.)

According to this invention as described above, the dye used to construct the present heat transfer sheet shows an increased thermal migration and exhibits dyeability and color developability with respect to the image-receiving material, since, although, due to its specific structure of having two chromophores linked together through a divalent linking group, it has a molecular weight much higher than that of the sublimable dye (having a molecular weight of about 150 to 250) used with conventional heat transfer sheets, yet it shows a molar absorption coefficient at least twice as high as that of a conventional dye having a single chromophore. This dye is also unlikely to migrate or bleed through the image-receiving material after transfer, making a great contribution to the storage stability of the resulting image representation over an extended period.

While the obtained image is formed by the dye, there are no discoloration/fading problems by indoor light in particular. Nor are there any discoloration/fading problems under conditions not directly exposed to light, as encountered in albums, cases or books.

Thus, various problems with the prior art can all be solved, because the image formed with the instant heat transfer sheet is so improved in terms of fastness properties, esp., resistance to migration and contamination as well as resistance to discoloration and fading that, even when stored over an extended period of time, it is most unlikely to lose sharpness and clearness or contaminate other articles.

The present invention will now be explained more illustratively with reference to the reference examples, examples and comparative examples, in which unless otherwise stated, the "parts" and "%" are given by weight.

REFERENCE EXAMPLE A1

N-n-butylaniline (4 equivalents), pentamethylene dibromide (1 equivalent) and sodium carbonate (4 equivalents) were placed in a reactor for a 4-hour reaction at 100° to 140° C. After the completion of the reaction, toluene was added to the reaction product to solubilize the organic matter and remove the inorganic precipitates. After concentration, the obtained toluene solution was purified by distillation to obtain bis(N-n-butylaniline)pentane.

Apart from this, phosphorus oxychloride (4 equivalents) was added dropwise to dimethylformamide (15 equivalents) to prepare Bilsmyer reagent. A solution of bis(N-n-butylaniline)pentane (1 equivalent) dissolved in dimethylformaldehyde was added dropwise to that reagent for a 2.5-hour reaction at 85° C. After the completion of the reaction, sodium acetate, water and ethyl acetate were added to the reaction solution to separate an ethyl acetate layer. This solution was concentrated and purified through a column to obtain a bisformyl compound.

The bisformyl compound (1 equivalent), manolonitrile (3 equivalents) and ethanol were placed in a reactor, in which they were permitted to react with each other under reflux with the dropwise addition of piperidine for 1.5 hours. After the completion of the reaction, the precipitated crystals were filtered out and purified through a column to obtain Dye No. 9 set out in Table A1.

REFERENCE EXAMPLE A2-A32

Dye Nos. 1-8 and 10-32 set out in Table A1 were prepared from the starting materials corresponding thereto according to the procedures of Reference Ex. 1.

EXAMPLE A

A number of dye carrier layer-forming ink compositions comprising the following components were prepared and coated on a 6-μm thick polyethylene terephthalate film, subjected on its back side to a heat-resistant treatment, to a dry coverage of 1.0 g/m$^2$, followed by drying. In this way, a number of heat transfer sheets according to this invention were obtained.

| Dyes specified in Table A1 | 3 parts |
| Polyvinyl butyral resin | 4.5 parts |
| Methyl ethyl ketone | 46.25 parts |
| Toluene | 46.25 parts |

However, when the dyes were insoluble in the above-mentioned compositions, DMF, dioxane, chloroform and so on were optionally used as solvents.

Then, a coating liquid comprising the following components was coated on one side of a synthetic paper (Yupo FPG#150 commercialized by Oji Yuka Co., Ltd.) used as a substrate sheet at a ratio of 10.0 g/m² on dry basis, followed by drying at 100° C. for 30 minutes. In this way, an image-receiving material was obtained.

| | |
|---|---|
| Polyester resin (Vylon 200 commercialized by Toyobo Co., Ltd.) | 11.5 parts |
| Vinyl chloride/vinyl acetate copolymer (VYHH commercialized by UCC) | 5.0 parts |
| Amino-modified silicone (KF-393 commercialized by the Shin-Etsu Chemical Co., Ltd.) | 1.2 parts |
| Epoxy-modified silicone (S-22-343 commercialized by the Shin-Etsu Chemical Co., Ltd.) | 1.2 parts |
| Methyl ethyl ketone/toluene/cyclohexanone (at a weight ratio of 4:4:2) | 102.0 parts |

Each of the instant heat transfer sheets was overlaid on the above-mentioned image-receiving material, while their dye carrier layer and dye-receiving surface were located in opposition to each other. Recording was then performed from the back side of the heat transfer sheet at a head application voltage of 10 V for 4.0 msec. with a thermal head. The results are reported in Table A2.

TABLE A2

| Dyes | Color Density | Storability | Color Tone |
|---|---|---|---|
| 1 | 1.23 | ⊚ | Yellow |
| 2 | 1.32 | ⊚ | Yellow |
| 3 | 1.10 | ○ | Yellow |
| 4 | 2.48 | ○ | Yellow |
| 5 | 2.36 | ○ | Yellow |
| 6 | 2.18 | ⊚ | Yellow |
| 7 | 1.30 | ○ | Yellow |
| 8 | 1.50 | ⊚ | Yellow |
| 9 | 2.25 | ○ | Yellow |
| 10 | 1.94 | ○ | Yellow |
| 11 | 2.40 | ○ | Yellow |
| 12 | 1.80 | ⊚ | Yellow |
| 13 | 2.31 | ○ | Yellow |
| 14 | 1.95 | ⊚ | Yellow |
| 15 | 1.85 | ⊚ | Yellow |
| 16 | 1.87 | ○ | Yellow |
| 17 | 2.12 | ⊚ | Yellow |
| 18 | 1.65 | ⊚ | Yellow |
| 19 | 1.47 | ⊚ | Yellow |
| 20 | 1.95 | ○ | Yellow |
| 21 | 2.13 | ○ | Yellow |
| 22 | 1.78 | ○ | Yellow |
| 23 | 1.44 | ⊚ | Yellow |
| 24 | 1.56 | ⊚ | Yellow |
| 25 | 1.60 | ⊚ | Yellow |
| 26 | 1.43 | ⊚ | Yellow |
| 27 | 1.38 | ⊚ | Yellow |
| 28 | 1.73 | ○ | Yellow |
| 29 | 1.51 | ⊚ | Vermillion Red |
| 30 | 2.17 | ○ | Vermillion Red |
| 31 | 2.36 | ○ | Vermillion Red |
| 32 | 2.28 | ⊚ | Vermillion Red |

COMPARATIVE EXAMPLES A1–4

The procedures of Example A1 were followed with the exception that the dyes set out in Table A3, given just below, were used. The results are reported in Table A3.

TABLE A3

| Comp. Ex. | Color Density | Storability |
|---|---|---|
| A1 | 2.32 | X |
| A2 | 2.19 | X |
| A3 | 1.75 | X |
| A4 | 1.48 | X |

Comp. Ex. A1 = C.I. Solvent Yellow 56
Comp. Ex. A2 = C.I. Solvent Yellow 14
Comp. Ex. A3 = C.I. Disperse Yellow 3
Comp. Ex. A4 = C.I. Disperse Yellow 54

It is noted that the color density values reported were measured with a densitometer RD-918 commercialized by Macbeth Co., Ltd., U.S.A.

Storability was measured after the recorded images had been allowed to stand for 48 hours in an atmosphere of 70° C. and estimated by:

Double circle (⊚): the images underwent no change in sharpness and white paper was not colored even when it was rubbed with the images.
Circle (○): the images lost sharpness slightly and white paper was slightly colored.
Triangle (Δ): the images lost sharpness and white paper was colored.
Cross (X): the images became blurred and white paper was severely colored.

EXAMPLE B

A number of dye carrier layer-forming ink compositions comprising the following components were prepared and coated on a 6-μm thick polyethylene terephthalate film, subjected on its back side to a heat-resistant treatment, to a dry coverage of 1.0 g/m², followed by drying. In this way, a number of heat transfer sheets according to this invention were obtained.

| | |
|---|---|
| Dyes specified in Table B1 | 3 parts |
| Polyvinyl butyral resin | 4.5 parts |
| Methyl ethyl ketone | 46.25 parts |
| Toluene | 46.25 parts |

However, when the dyes were insoluble in the above-mentioned compositions, DMF, dioxane, chloroform and so on were optionally used as solvents.

Then, a coating liquid comprising the following components was coated on one side of a synthetic paper (Yupo FPG#150 commercialized by Oji Yuka Co., Ltd.) used as a substrate sheet at a ratio of 10.0 g/m² on dry basis, followed by drying at 100° C. for 30 minutes. In this way, an image-receiving material was obtained.

| | |
|---|---|
| Polyester resin (Vylon 200 commercialized by Toyobo Co., Ltd.) | 11.5 parts |
| Vinyl chloride/vinyl acetate copolymer (VYHH commercialized by UCC) | 5.0 parts |
| Amino-modified silicone (KF-393 commercialized by the Shin-Etsu Chemical Co., Ltd.) | 1.2 parts |
| Epoxy-modified silicone (S-22-343 commercialized by the Shin-Etsu Chemical Co., Ltd.) | 1.2 parts |
| Methyl ethyl ketone/toluene/cyclohexanone (at a weight ratio of 4:4:2) | 102.0 parts |

Each of the instant heat transfer sheets was overlaid on the above-mentioned image-receiving material, while their dye carrier layer and dye-receiving surface were located in opposition to each other. Recording was then performed from the back side of the heat transfer sheet at a head application voltage of 10 V for 4.0 msec. with a thermal head. The results are reported in Table B2.

TABLE B2

| Dyes | Color Density | Storability | Color Tone |
|---|---|---|---|
| 1 | 1.97 | ⊚ | Yellow |
| 2 | 2.04 | ⊚ | Yellow |
| 3 | 1.91 | ⊚ | Yellow |
| 4 | 1.75 | ⊚ | Yellow |
| 5 | 1.78 | ⊚ | Yellow |
| 6 | 1.79 | ⊚ | Yellow |
| 7 | 1.11 | ⊚ | Yellow |
| 8 | 1.48 | ⊚ | Yellow |
| 9 | 1.73 | ⊚ | Yellow |
| 10 | 1.41 | ⊚ | Yellow |
| 11 | 1.76 | ⊚ | Yellow |
| 12 | 1.51 | ⊚ | Yellow |
| 13 | 1.63 | ⊚ | Yellow |
| 14 | 1.71 | ⊚ | Yellow |
| 15 | 1.87 | ⊚ | Yellow |
| 16 | 1.84 | ⊚ | Yellow |
| 17 | 1.68 | ⊚ | Yellow |
| 18 | 1.70 | ⊚ | Yellow |
| 19 | 1.59 | ⊚ | Yellow |
| 20 | 1.64 | ⊚ | Yellow |
| 21 | 1.75 | ⊚ | Yellow |

COMPARATIVE EXAMPLES B1-4

The procedure of Example B1 were followed with the exception that the dyes set out in Table B3, given just below, were used. The results are reported in Table B3.

TABLE B3

| Comp. Ex. | Color Density | Storability |
|---|---|---|
| B1 | 2.32 | X |
| B2 | 2.19 | X |
| B3 | 1.75 | X |
| B4 | 1.48 | X |

Comp. Ex. B1=C.I. Solvent Yellow 56
Comp. Ex. B2=C.I. Solvent Yellow 14
Comp. Ex. B3=C.I. Disperse Yellow 3
Comp. Ex. B4=C.I. Disperse Yellow 54

It is noted that the color density values reported were measured with a densitometer RD-918 commercialized by Macbeth Co., Ltd., U.S.A.

Storability was measured after the recorded images had been allowed to stand for 48 hours in an atmosphere of 70° C. and estimated by:

Double circle (⊚): the images underwent no change in sharpness and white paper was not colored even when it was rubbed with the images.
Circle (○): the images lost sharpness slightly and white paper was slightly colored.
Triangle (△): the images lost sharpness and white paper was colored.
Cross (X): the images became blurred and white paper was severely colored.

REFERENCE EXAMPLE C1 (PREPARATION OF DYE)

(i) While cooled and stirred, 5.4 g of phosphorus oxychloride were added dropwise to 11.0 g of dimethylformamide, and 3.7 g of N,N'-di-n-butyl-N,N'-diphenyl-1,5-diaminopentane dissolved in dimethylformamide were added dropwise to the resulting solution, followed by heating and stirring at 85° C. for 2.5 hours. After the completion of the reaction, sodium acetate, water and ethyl acetate were added to the reaction solution to separate an ethyl acetate layer, which was in turn concentrated. The concentrate was purified through a column with a mixed solvent of ethyl acetate with n-hexane to obtain 3.8 g of N,N'-di-n-butyl-N,N'-bis-(4-formylphenyl)-1,5-diaminopentane in a 90% yield (which was found to have a melting point 51°-52° C.).

(ii) 4.2 g of N,N'-di-n-butyl-N,N'-bis-(4-formylphenyl)-1,5-diaminopentane obtained at Step (i) and 2.0 g of malononitrile were heated in an ethanol solvent under reflux for 2 hours in the presence of 0.2 g of piperidine. After cooling, the precipitated crystals were filtered out. The obtained crystals were recrystallized from ethyl acetate to obtain 4.2 g of N,N'-di-n-butyl-N,N'-bis-[4-(2,2-dicyanoethylene)phenyl]-1,5-diaminopentane in an 80% yield (which was found to have a melting point of 136°-138° C.).

(iii) 3.9 g of N,N'-di-n-butyl-N,N'-bis-[4-(2,2-dicyanoethylene)phenyl]-1,5-diaminopentane obtained at Step (ii) were dissolved in 50 ml of dimethylformamide, and an aqueous solution of 1.2 g of potassium cyanide was added dropwise under agitation to the solution for a 3-hour reaction at 30°-35° C. After the completion of the reaction, 2.6 g of bromine were added dropwise to the reaction solution, followed by a 2-hour reaction at 25°-30° C. After the completion of the reaction, the oily precipitates were decanted to obtain an oily matter, which was in turn purified by chromatography to obtain 2.5 g of a bistricyanostyrene type dye or Dye No. 13 specified in Table C1 in a 59% yield. This dye was found to have a maximum absorption wavelength (in ethyl acetate) of 523 nm.

REFERENCE EXAMPLE C2-C22

Dye Nos. 1-12 and 14-22 set out in Table C1 were prepared from the starting materials corresponding thereto according to the procedures of Reference Ex. C1.

EXAMPLE C

A number of dye carrier layer-forming ink compositions comprising the following components were prepared and coated on a 6-μm thick polyethylene terephthalate film, subjected on its back side to a heat-resistant treatment, to a dry coverage of 1.0 g/m², followed by drying. In this way, a number of heat transfer sheets according to this invention were obtained.

| Dyes specified in Table C1 | 3 parts |
|---|---|
| Polyvinyl butyral resin | 4.5 parts |
| Methyl ethyl ketone | 46.25 parts |
| Toluene | 46.25 parts |

However, when the dyes were insoluble in the above-mentioned compositions, DMF, dioxane, chloroform and so on were optionally used as solvents.

Then, a coating liquid comprising the following components was coated on one side of a synthetic paper (Yupo FPG#150 commercialized by Oji Yuka Co., Ltd.}used as a substrate sheet at a ratio of 10.0 g/m² on dry basis, followed by drying at 100° C. for 30 minutes. In this way, an image-receiving material was obtained.

| Polyester resin (Vylon 200 commercialized by Toyobo Co., Ltd.) | 11.5 parts |
|---|---|
| Vinyl chloride/vinyl acetate copolymer | 5.0 parts |

-continued

| | |
|---|---|
| (VYHH commercialized by UCC) | |
| Amino-modified silicone (KF-393 commercialized by the Shin-Etsu Chemical Co., Ltd.) | 1.2 parts |
| Epoxy-modified silicone (S-22-343 commercialized by the Shin-Etsu Chemical Co., Ltd.) | 1.2 parts |
| Methyl ethyl ketone/toluene/cyclohexanone (at a weight ratio of 4:4:2) | 102.0 parts |

Each of the instant heat transfer sheets was overlaid on the above-mentioned image-receiving material, while their dye carrier layer and dye-receiving surface were located in opposition to each other. Recording was then performed from the back side of the heat transfer sheet at a head application voltage of 10 V for 4.0 msec. with a thermal head. The results are reported in Table $C_2$.

TABLE C2

| Dyes | Color Density | Storability | Color Tone |
|---|---|---|---|
| 1 | 2.28 | ⊚ | Red |
| 2 | 2.41 | ⊚ | Red |
| 3 | 2.18 | ⊚ | Red |
| 4 | 2.04 | ⊚ | Red |
| 5 | 2.10 | ⊚ | Red |
| 6 | 2.27 | ⊚ | Red |
| 7 | 2.42 | ⊚ | Red |
| 8 | 2.13 | ⊚ | Red |
| 9 | 2.13 | ⊚ | Red |
| 10 | 2.38 | ⊚ | Red |
| 11 | 2.07 | ⊚ | Red |
| 12 | 2.09 | ⊚ | Red |
| 13 | 2.16 | ⊚ | Red |
| 14 | 2.05 | ⊚ | Red |
| 15 | 2.32 | ⊚ | Red |
| 16 | 2.07 | ⊚ | Red |
| 17 | 1.78 | ⊚ | Red |
| 18 | 2.26 | ⊚ | Red |
| 19 | 1.93 | ⊚ | Red |
| 20 | 1.69 | ⊚ | Red |
| 21 | 1.52 | ⊚ | Red |
| 22 | 2.13 | ⊚ | Red |

COMPARATIVE EXAMPLES $C_{1-4}$

The procedures of Example $C_1$ were followed with the exception that the dyes set out in Table $C_3$, given just below, were used. The results are reported in Table $C_3$.

TABLE B3

| Comp. Ex. | Color Density | Storability |
|---|---|---|
| C1 | 0.99 | X |
| C2 | 1.16 | Δ |
| C3 | 2.07 | X |
| C4 | 1.12 | Δ |

Comp. Ex. C1 = C.I. Disperse Red 60
Comp. Ex. C2 = C.I. Disperse Violet 26
Comp. Ex. C3 = C.I. Solvent Red 19
Comp. Ex. C4 = C.I. Disperse Red 73

It is noted that the color density values reported were measured with a densitometer RD-918 commercialized by Macbeth Co., Ltd., U.S.A.

Storability was measured after the recorded images had been allowed to stand for 48 hours in an atmosphere of 70° C. and estimated by:

Double circle (⊚): the images underwent no change in sharpness and white paper was not colored even when it was rubbed with the images.

Circle (○): the images lost sharpness slightly and white paper was slightly colored.

Triangle (Δ): the images lost sharpness and white paper was colored.

Cross (X): the images became blurred and white paper was severely colored.

REFERENCE EXAMPLE D1

Added to a solution of 9.4 g of 3,3'-diethylamino-6,6'-diformyldiphenylmethane and 5.1 g of malononitrile in 96 ml of ethanol were 0.4 g of piperidine for a 1-hour reaction under reflux. After the completion of the reaction, the reaction solution was cooled to precipitate crystals, which were in turn filtered out.

The obtained crude crystals were purified by chromatography to obtain 4.2 g of Dye No. 1 specified in Table D1 in a 35% yield (which was found to have a melting point of 213°-214° C.).

REFERENCE EXAMPLES D2-D26

Dye Nos. 2-21 set out in Table D1 and Dye Nos. 1-15 in Table D2 were prepared from the starting materials corresponding thereto according to the procedures of Reference Ex. D1.

EXAMPLE D

A number of dye carrier layer-forming ink compositions comprising the following components were prepared and coated on a 6-μm thick polyethylene terephthalate film, subjected on its back side to a heat-resistant treatment, to a dry coverage of 1.0 g/m², followed by drying. In this way, a number of heat transfer sheets according to this invention were obtained.

| | |
|---|---|
| Dyes specified in Table D1 or D2 | 3 parts |
| Polyvinyl butyral resin | 4.5 parts |
| Methyl ethyl ketone | 46.25 parts |
| Toluene | 46.25 parts |

However, when the dyes were insoluble in the above-mentioned compositions, DMF, dioxane, chloroform and so on were optionally used as solvents. When no sufficient dissolution took place even with the above-mentioned solvents, their filtrates were used.

Then, a coating liquid comprising the following components was coated on one side of a synthetic paper (Yupo FPG#150 commercialized by Oji Yuka Co., Ltd.) used as a substrate sheet at a ratio of 10.0 g/m² on dry basis, followed by drying at 100° C. for 30 minutes. In this way, an image-receiving material was obtained.

| | |
|---|---|
| Polyester resin (Vylon 200 commercialized by Toyobo Co., Ltd.) | 11.5 parts |
| Vinyl chloride/vinyl acetate copolymer (VYHH commercialized by UCC) | 5.0 parts |
| Amino-modified silicone (KF-393 commercialized by the Shin-Etsu Chemical Co., Ltd.) | 1.2 parts |
| Epoxy-modified silicone (S-22-343 commercialized by the Shin-Etsu Chemical Co., Ltd.) | 1.2 parts |
| Methyl ethyl ketone/toluene/cyclohexanone (at a weight ratio of 4:4:2) | 102.0 parts |

Each of the instant heat transfer sheets was overlaid on the above-mentioned image-receiving material, while their dye carrier layer and dye-receiving surface were located in opposition to each other. Recording was then performed from the back side of the heat transfer sheet at a head application voltage of 10 V for 4.0 msec. with a thermal head. The results are reported in Table D3.

TABLE D3

| Dyes | Color Density | Storability | Color Tone |
|---|---|---|---|
| 1-1 | 2.21 | ○ | Yellow |
| 1-2 | 1.75 | ⊚ | Yellow |
| 1-3 | 1.83 | ⊚ | Yellow |
| 1-4 | 1.44 | ⊚ | Yellow |
| 1-5 | 1.78 | ⊚ | Yellow |
| 1-6 | 1.89 | ⊚ | Yellow |
| 1-7 | 2.05 | ⊚ | Yellow |
| 1-8 | 1.49 | ⊚ | Yellow |
| 1-9 | 1.89 | ○ | Yellow |
| 1-10 | 1.47 | ⊚ | Yellow |
| 1-11 | 2.10 | ⊚ | Yellow |
| 1-12 | 1.96 | ⊚ | Yellow |
| 1-13 | 1.97 | ⊚ | Yellow |
| 1-14 | 1.69 | ⊚ | Yellow |
| 1-15 | 1.93 | ⊚ | Yellow |
| 1-16 | 2.20 | ○ | Yellow |
| 1-17 | 1.95 | ⊚ | Yellow |
| 1-18 | 1.95 | ⊚ | Yellow |
| 1-19 | 1.77 | ⊚ | Yellow |
| 1-20 | 1.69 | ⊚ | Yellow |
| 1-21 | 2.11 | ○ | Yellow |
| 2-1 | 2.19 | ○ | Orange |
| 2-2 | 1.79 | ⊚ | Orange |
| 2-3 | 1.84 | ⊚ | Orange |
| 2-4 | 1.50 | ⊚ | Orange |
| 2-5 | 1.74 | ⊚ | Orange |
| 2-6 | 1.99 | ⊚ | Orange |
| 2-7 | 1.93 | ⊚ | Orange |
| 2-8 | 1.48 | ⊚ | Orange |
| 2-9 | 1.82 | ○ | Orange |
| 2-10 | 1.43 | ⊚ | Orange |
| 2-11 | 2.15 | ⊚ | Orange |
| 2-12 | 1.89 | ⊚ | Orange |
| 2-13 | 1.93 | ⊚ | Orange |
| 2-14 | 1.65 | ⊚ | Orange |
| 2-15 | 1.91 | ⊚ | Orange |

COMPARATIVE EXAMPLES D1-D4

The procedure of Example D1 were followed with the exception that the dyes set out in Table D4, given just below, were used. The results are reported in Table D4.

TABLE D4

| Comp. Ex. | Color Density | Storability |
|---|---|---|
| D1 | 2.32 | X |
| D2 | 2.19 | X |
| D3 | 1.75 | X |
| D4 | 1.48 | X |

Comp. Ex. D1=C.I. Solvent Yellow 56
Comp. Ex. D2=C.I. Solvent Yellow 14
Comp. Ex. D3=C.I. Disperse Yellow 3
Comp. Ex. D4=C.I. Disperse Yellow 54

It is noted that the color density values reported were measured with a densitometer RD-918 commercialized by Macbeth Co., Ltd., U.S.A.

Storability was measured after the recorded images had been allowed to stand for 48 hours in an atmosphere of 70° C. and estimated by:

Double circle (⊚): the images underwent no change in sharpness and white paper was not colored even when it was rubbed with the images.

Circle (○): the images lost sharpness slightly and white paper was slightly colored.

Triangle (△): the images lost sharpness and white paper was colored.

Cross (X): the images became blurred and white paper was severely colored.

According to this invention as described above, the dye used to construct the present heat transfer sheet shows an increased thermal migration and exhibits dyeability and color developability with respect to the image-receiving material, since although it has a molecular weight much higher than that of the sublimable dye (having a molecular weight of about 150 to 250) used with conventional heat transfer sheets, yet it assumes a specific structure and has a specific substituent at a specific location. This dye is also unlikely to migrate or bleed through the image-receiving material after transfer.

While the obtained image representation is formed by the dye, there are no discoloration/fading problems by indoor light in particular. Nor are there any discoloration/fading problems under conditions not directly exposed to light, as encountered in albums, cases or books.

Thus, various problems with the prior art can all be solved, because the image representation formed with the instant heat transfer sheet is so improved in terms of fastness properties, esp., resistance to migration and contamination as well as resistance to discoloration and fading that, even when stored over an extended period of time, it is most unlikely to lose sharpness and clearness or contaminate other articles.

INDUSTRIAL APPLICABILITY

The heat transfer sheets according to this invention may have wide application as ink donor sheets for heat transfer systems using thermal printing means such as a thermal head.

We claim:

1. A heat transfer sheet comprising:
a substrate sheet; and
a dye carrier layer formed on one side of said substrate sheet and comprising a sublimable dye and a binder, said sublimable dye comprising a compound having two chromophores linked together through a divalent linking group, wherein said divalent linking group is non-conjugated with said chromophores.

2. A heat transfer sheet as claimed in claim 1, wherein the dye contained in said dye carrier layer is represented by the following general formula (I):

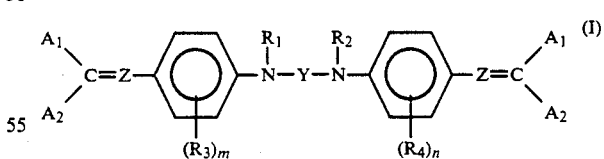

wherein:
groups $R_1$ and $R_2$, which may be identical with or different from each other, each stand for a hydrogen atom, a substituted or unsubstituted alkyl, cycloalkyl, aralkyl or aryl group, or an atom or atomic group which forms a five- or six-membered ring together with groups $R_3$ or $R_4$;
groups $R_3$ and $R_4$, which may be identical with or different from each other, each stand for a hydrogen atom, a halogen atom, a cyano group, or a substituted or unsubstituted alkyl, cycloalkyl, alkoxy, aryl, aralkyl, acylamino, sulfonylamino, ureido, carbamoyl, sulfamoyl, acyl or amino group;

groups $A_1$ and $A_2$ denote identical or different electron attractive groups, provided that one of groups $A_1$ and $A_2$ may be an aryl group;

group Z indicates a methine group or a nitrogen atom;

group Y represents a divalent linking group; and m and n each are an integer of 1 to 3.

3. A heat transfer sheet as claimed in claim 2, wherein the dye has a molecular weight of at least 400.

4. A heat transfer sheet as claimed in claim 2, wherein $R_1$ and $R_2$ each are an alkyl group having 1 to 6 carbon atoms; $R_3$ and $R_4$ each are a hydrogen atom or an alkyl group having 1 to 6 carbon atoms; $A_1$ and $A_2$ each are a cyano group or an alkoxycarbonyl or alkylaminocarbonyl group having 1 to 6 carbon atoms; and Y is a $C_2$ to $C_{10}$ alkylene group which may contain a different atom.

5. A heat transfer sheet as claimed in claim 1, wherein the dye contained in said dye carrier layer is represented by the following general formula (II):

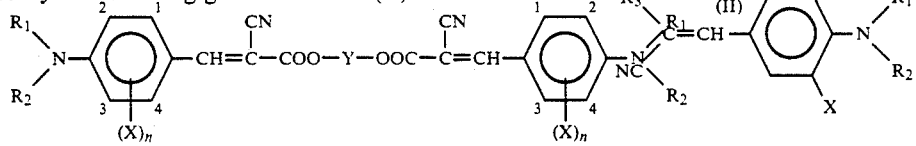

wherein:

groups $R_1$ and $R_2$, which may be identical with or different from each other, each stand for a hydrogen atom, a substituted or unsubstituted alkyl, cycloalkyl, aralkyl or aryl group, or may form together a five- or six-membered ring;

groups X, which may be identical with or different from each other, each represent a hydrogen or halogen atom, or a substituted or unsubstituted alkyl, cycloalkyl, alkoxy, aralkyl, acylamino, sulfonylamino, ureido, carbamoyl, sulfamoyl, alkoxycarbonyl, allyloxycarbonyl, acyl or amino group;

group Y represents a divalent linking group; and m and n each are an integer of 1 or 2.

6. A heat transfer sheet as claimed in claim 5, wherein the dye has a molecular weight of at most 700.

7. A heat transfer sheet as claimed in claim 5, wherein the group Y is a $C_2$ to $C_{10}$ alkylene group which may contain a different atom.

8. A heat transfer sheet as claimed in claim 1, wherein the dye contained in said dye carrier layer is represented by the following general formula (III):

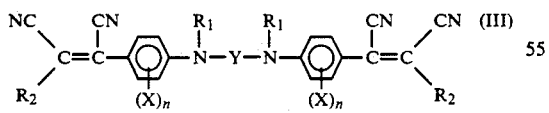

wherein:

groups $R_1$, which may be identical with or different from each other, each represent a hydrogen atom or a substituted or unsubstituted alkyl, cycloalkyl, aralkyl or aryl group, or may form together a five- or six-membered ring with groups X;

groups $R_2$ each denote an electron attractive group;

groups X, which may be identical with or different from each other, each stand for a hydrogen atom, a halogen atom, or a substituted or unsubstituted alkyl, cycloalkyl, alkoxy, aralkyl, acylamino, sulfonylamino, ureido, carbamoyl, sulfamoyl, acyl or amino group;

group Y indicates a divalent linking group; and n is an integer of 1 or 2.

9. A heat transfer sheet as claimed in claim 8, wherein the dye has a molecular weight of at most 570.

10. A heat transfer sheet as claimed in claim 8, wherein the group Y is a $C_2$ to $C_{10}$ alkylene group which may contain a different atom.

11. A heat transfer sheet as claimed in claim 1, wherein the dye contained in said dye carrier layer is expressed by the following general formula (IV) or (V):

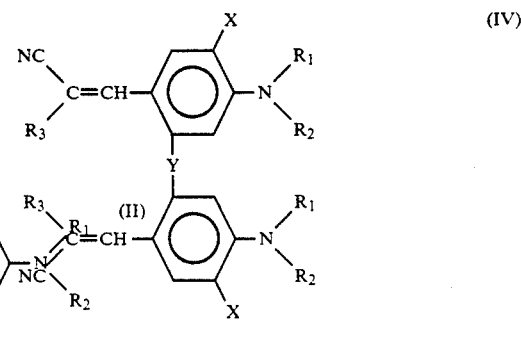

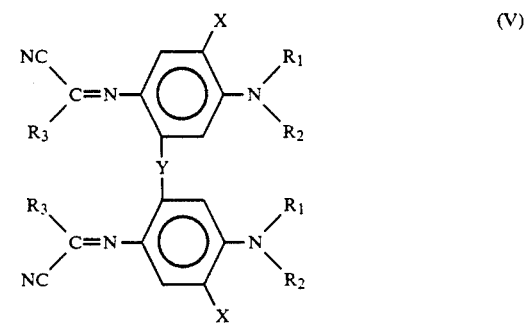

wherein:

groups $R_1$ and $R_2$, which may be identical with or different from each other, each represent a hydrogen atom or a substituted or unsubstituted alkyl, cycloalkyl, aralkyl or aryl group, or may form together a five- or six-membered ring which may contain an oxygen, nitrogen or sulfur atom;

groups $R_3$, which may be identical with or different from each other, each denote an electron attractive group;

group Y indicates a divalent linking group; and groups X each stand for a hydrogen atom or an atom or atomic group which forms a five- or six-membered ring together with $R_1$.

12. A heat transfer sheet as claimed in claim 11, wherein the dye has a molecular weight in the range of 300-700.

13. A heat transfer sheet as claimed in claim 1, wherein the divalent linking group is a substituted or nonsubstituted alkylene group.

14. A heat transfer sheet as claimed in claim 1, wherein the divalent linking group is a $C_2$ to $C_{10}$ alkylene group which may contain a different atom.

* * * * *